United States Patent [19]
Tamano et al.

[11] Patent Number: 6,032,157
[45] Date of Patent: Feb. 29, 2000

[54] RETRIEVAL METHOD USING IMAGE INFORMATION

[75] Inventors: Maki Tamano, Minoo; Hiroyuki Okuda, Ikeda; Hiroshi Yajima, Suita; Tadashi Hirose, Komae; Noritugu Kagaya, Hiroshima, all of Japan

[73] Assignee: Hitachi, Ltd., Tokyo, Japan

[21] Appl. No.: 09/103,506

[22] Filed: Jun. 24, 1998

Related U.S. Application Data

[63] Continuation of application No. 08/405,987, Mar. 17, 1995.

[30] Foreign Application Priority Data

Mar. 17, 1994 [JP] Japan .................................. 6-046721

[51] Int. Cl.$^7$ ........................................ G06F 17/30
[52] U.S. Cl. ......................... 707/104; 707/3; 707/501; 707/505; 707/529; 707/541; 707/531; 707/539; 345/335; 345/968
[58] Field of Search .............................. 707/3, 501, 104, 707/505, 541, 529, 531, 539; 345/335, 968

[56] References Cited

U.S. PATENT DOCUMENTS

| | | | |
|---|---|---|---|
| 4,752,773 | 6/1988 | Togawa et al. ......................... | 345/156 |
| 4,920,337 | 4/1990 | Kuo ......................................... | 345/507 |
| 4,931,957 | 6/1990 | Takagi et al. ........................... | 358/453 |
| 5,029,112 | 7/1991 | Sakamoto et al. ..................... | 345/418 |
| 5,060,280 | 10/1991 | Mita et al. .............................. | 382/283 |
| 5,123,088 | 6/1992 | Kasahara et al. ...................... | 345/357 |
| 5,150,458 | 9/1992 | Masuzaki et al. ..................... | 345/435 |
| 5,253,337 | 10/1993 | Hirose ..................................... | 345/357 |
| 5,420,703 | 5/1995 | Sakai et al. ............................. | 358/501 |
| 5,420,968 | 5/1995 | Jojri ........................................ | 345/433 |
| 5,444,550 | 8/1995 | Enokida et al. ........................ | 358/453 |
| 5,499,327 | 3/1996 | Satoh .................................... | 345/435 |
| 5,526,520 | 6/1996 | Krause ................................... | 707/104 |
| 5,537,132 | 7/1996 | Teraoka et al. ........................ | 345/133 |
| 5,625,771 | 4/1997 | Sakaguchi et al. .................... | 707/501 |
| 5,625,810 | 4/1997 | Kurosu et al. ......................... | 707/1 |
| 5,659,626 | 8/1997 | Ort et al. ................................ | 382/125 |
| 5,729,731 | 3/1998 | Yajima et al. .......................... | 707/3 |
| 5,794,178 | 8/1998 | Caid et al. .............................. | 704/9 |
| 5,799,098 | 8/1998 | Ort et al. ................................ | 382/125 |
| 5,802,492 | 9/1998 | DeLorme et al. ...................... | 701/200 |
| 5,857,199 | 1/1999 | Tamano et al. ........................ | 707/3 |

OTHER PUBLICATIONS

"Aristown", Pixel, No. 56, pp. 73–78, no date.

T. Sakaguichi et al, "An Evaluation on Man–Machine Interface for Geographical Information Systems", Proceedings of the 37th Annual Conference of the Institute of Systems, Control and Information Engineers, ISCIE, May 19–21, 1993, pp. 275–276.

Primary Examiner—Thomas G. Black
Assistant Examiner—Jean M. Corriteélus
Attorney, Agent, or Firm—Beall Law Offices

[57] ABSTRACT

For retrieving attribute information through image information which is not linked with the attribute information: displaying on a display screen the first image information corresponding with attribute information and second image information that has a common attribute with the first image information; and storing a correspondence between the first image information and the second image information in response to an input of an instruction to confirm the correspondence between the first image information and the second image information, and retrieving and displaying the attribute information on the basis of the stored correspondence between the first image information and the second image information as well as correspondence information between the first image information and the attribute information, in response to an input for object choice indicated by the second image information.

12 Claims, 14 Drawing Sheets

| LINK INFO. TABLE | | | |
|---|---|---|---|
| FIRST IMAGE | | SECOND IMAGE | |
| IMAGE NO. | X, Y | IMAGE NO. | X, Y |
| 1 | {X1',Y1'} | 2 | {X2',Y2'} |
| | | | |
| | | | |
| | | | |
| | | | |
| | | | |

| DB NO. / RECORD NO. | IMAGE NO. | X, Y |
|---|---|---|
| | | |
| | | |
| | | |
| | | |
| | | |
| | | |

RETRIEVAL METHOD USING IMAGE INFORMATION this is a continuation application of U.S. Ser. No. 08/405,987, filed Mar. 17, 1995.

BACKGROUND OF THE INVENTION

The present invention relates to retrieving attribute information about an object represented in image information, more particularly, geographic information.

There is prior art for displaying geographic (map) information and attribute information about individual objects contained in the map when there is correspondence therebetween, choosing an object in the geographic information, and retrieving attribute information corresponding to the chosen object. For example, the local-government map system, "ARISTOWN", which is described in *PIXEL* (No. 56, pp. 73–78) is for framing a policy by using a map and administrative information, which is road information and ground information, together. This system provides connection between geographic information represented by vectors and descriptive data (attribute information). Features of the system are the retrieval of an administrative file on the basis of correspondence information between the administrative file and a map database for the computer processing of maps.

In the above-mentioned prior art, if attribute information is to be retrieved on the basis of the shapes or positional relations of objects present on displayed geographic information, a vector map which represents the objects by using vectors is prepared in advance, and, in addition, a correspondence which links the vector map and the descriptive data (attribute information) to each other is input. For this reason, to retrieve attribute information by using a map, first of all, it is necessary to prepare a vector map and input a correspondence. This work leads to the problems of consumed time and high cost.

To solve these problems, it has been considered to use an image map instead of the vector map. One example of correspondence information between image information, such as drawings or maps, and attribute information associated with the image information is introduced in "SCI' 93", the proceedings of the thirty-seventh, research-supporting lecture meeting held by the Institute of Systems' Control and Information Engineers, pp. 275–276, 1993. This publication discloses the preparation of link data for linking text DB information to image information. In the publication, map information is one example of image information and it is proposed to increase the efficiency of linking objects displayed on an image map to descriptive data (attributes).

SUMMARY OF THE INVENTION

It is an object of the present invention to analyze problems in the prior art and provide solutions.

In general, a plurality of kinds of maps are present with respect to one district, according to different uses. For example, there are a topographical map which shows the topography of land, a city planning chart which shows the utilization of land or roads or facilities, a residence map on which the householders or individual households are described, a road map on which main roads are described in detail, a map which shows the location of underground buried facilities such as gas pipes or water pipes, a route map which shows traffic, and a cadastral map which shows numbers peculiar to individual lots.

Even if image map information representative of one of these plurality of kinds of maps and attribute information are linked, the attribute information and image map information representative of another kind of map of the same district are not automatically linked. For this reason, it has been impossible to retrieve attribute information by choosing an object contained in image information which is not linked with the attribute information.

A similar problem occurs where drawings or photographs are handled as the image information. For example, when one has a plurality of kinds of drawings or photographs which show the structures of components or machines, such as side elevational or cross-sectional views showing one component or machine and a photograph of an external appearance of such a component or machine, if attribute information is linked with one of the drawings, it will be possible to retrieve the attribute information by using the linked drawing. However, as in the case of the map information, it has been impossible to retrieve the attribute information by using another drawing which is not linked with the attribute information.

An object of the present invention is to retrieve attribute information through image information which is not linked with the attribute information.

Another object is to easily link image information displayed.

Another object is to display images in detail for a wide area on a restricted display screen with a clear understanding of the correspondence between images.

In order to retrieve attribute information not linked to image information, the image information is displayed and correspondence (linkage) between a displayed object and other image information is confirmed to retrieve attribute information already linked to the other image information. To easily find individual objects at this time, while the entire image information is being displayed, the respective parts of the image information which contain the objects concerned are magnified.

In accordance with the present invention, the above-described problems are solved. Image information linked with attribute information is hereinafter called first image information, and image information which approximately positionally corresponds to the first image information is called second image information and is not linked to the attribute information. Specifically, an object contained in the second image information is used as a key, and the attribute information linked with the first image information is retrieved by inputting a correspondence between the second image information and the first image information via the key, i.e. by selecting an object in the second image information.

Correspondence between a selected object in the second image information and a corresponding object or position in the first image information is stored in response to the inputting, e.g. inputting of an instruction confirming a displayed correspondence between the first image information and the second image information, and attribute information is retrieved on the basis of the thus stored correspondence as well as linkage information between the first image information and the attribute information in response to the inputting, e.g. the inputting of an object choice indicated by the second image information. The first image information, if displayed, is preferably erased from the display screen, in response to the inputting.

There are user choices of display and operation, including: overlying the second image information with the second image information, or vice versa, in display; moving either the displayed first image information or the displayed second image information to correct the overlying relation between the display positions of the first image information and the second image information; and changing the area of overlay, causing new areas of the first image information to overlie the second image information. Accordingly, the attribute information is retrieved in response to inputting of an object choice from the second image information, as if through the inputting the second image information and the attribute information were directly connected to each other.

The display of unnecessary image information is suppressed, whereby image information can be more definitely displayed.

By overlaying the displaying of second image information with the first image information in a single area, a wide area is displayed as compared to displaying a plurality of pieces of image information in separate display areas. In addition, by partly magnifying and displaying either or both of the overlying first image information and the overlain second image information, in such a manner as to view a map through a magnifying glass, it is possible to facilitate the inputting of correspondence information about detailed maps.

Even if the displayed first image information and the displayed second image information do not accurately overlie, moving one of the two displayed images as a part of the inputting will correct correspondence and obtain necessary attribute information.

BRIEF DESCRIPTION OF THE DRAWINGS

Further objects, features and advantages of the present invention will become more clear from the following detailed description of a preferred embodiment, described with respect to the accompanying drawing.

DETAILED DESCRIPTION OF A PREFERRED EMBODIMENT

In the description of the present embodiment, maps are one example of image information, while a resident database is one example of attribute information. The maps geographically (more broadly, physically) represent locations (or more broadly positionally) of objects such as: roads or railway tracks, facilities or buildings such as railway stations, airports and ports, and topography such as mountains, rivers, lakes, marshes or seas. Large-scale maps (that is enlarged) further represent smaller objects such as: telegraph poles, signposts, signals, roadside trees and the like. Maps for specific uses also describe underground buried facilities, which are objects such as water pipes, gas pipes or sewers.

Each of these constituent elements, such as buildings, of the map is referred to as an "object" that is an identifiable portion of displayed image information. Districts which are separated on the basis of physical conditions, such as roads or rivers, or artificially separated districts, such as administrative districts, are each also referred to as an "object".

Figure 1:
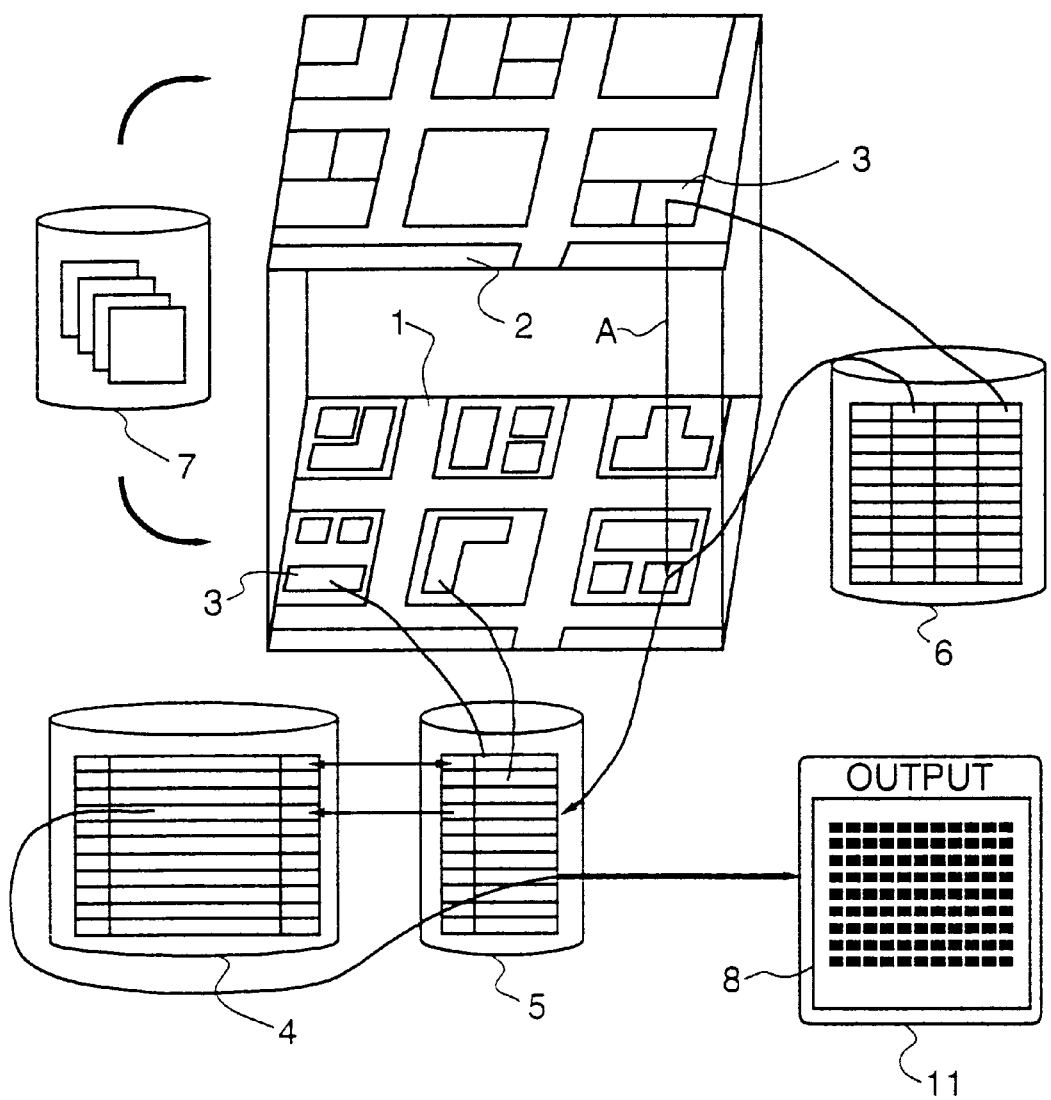
FIG. 1 is a system diagram showing the present invention.

In FIG. 1, at least two files of image information, i.e., first image information 1 and second image information 2, are employed, even though three or more may be used with the system at the same time. A residence map is one example of the first image information 1. The residence map is made up of objects 3 each of which represents the site (physical location) of a different household in the image. The respective objects 3 are linked to the attribute information stored in an attribute information file 4. This linkage is stored in a link information file 5 (shown in more detail in FIG. 5) for linking image objects and attributes. As one example of the second image information 2, a road map which describes the status of roads is employed. The second image information 2 has no stored direct linkage with the attribute information, but does have direct unstored correspondence to the first image information 1 only in physical positional relation. For example, two parts, objects of the first and second image information correspond to each other as indicated by an arrow A of FIG. 1, and portions thereof represent a positionally identical area. The correspondence (inputted by the user) between an object represented by the first image information 1 and an object represented by the second image information 2 is stored in a link information file 6 (shown in more detail in FIG. 3). The first and second image information is stored in respective locations of an image information file 7. Each of the aforesaid files 4, 5, 6, 7, which are separately shown for ease of explanation, may be stored in a single storage unit.

Figure 2:
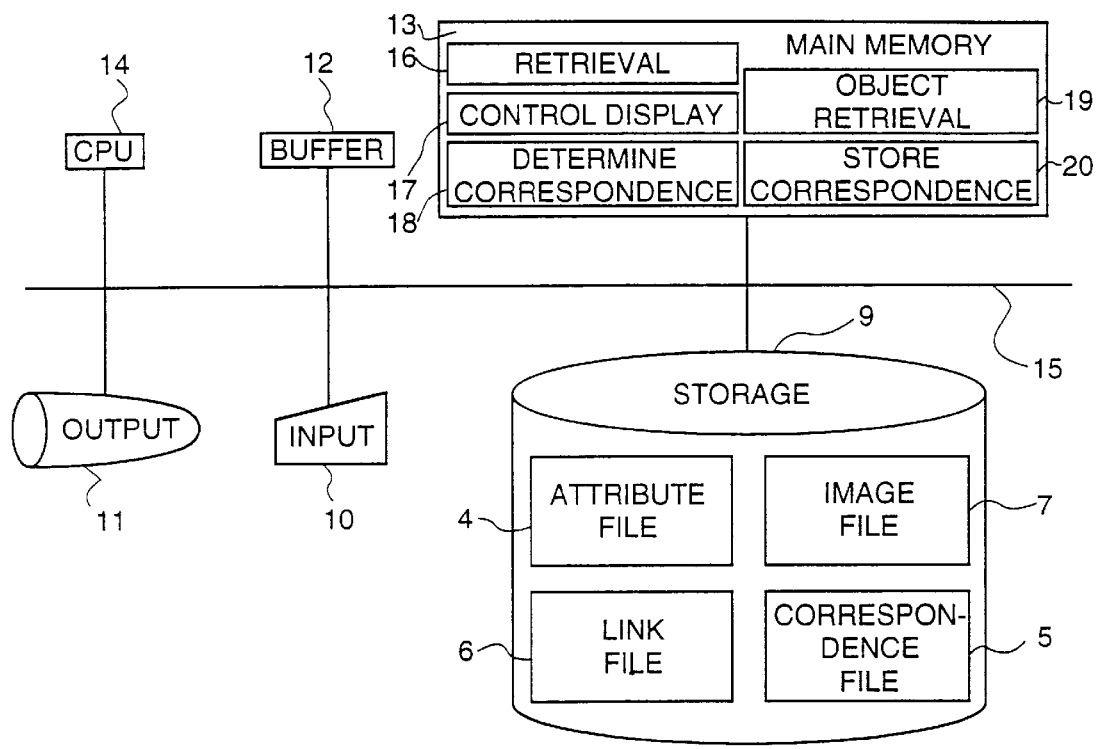
FIG. 2 is a system diagram of the system of FIG. 1 in different form.

Preferably the first image information 1 and at least part of the second image information 2 are displayed on an output device 11 (e.g. a screen) of FIG. 2, and a user inputs a choice of an object 3 from the display of the second image information 2 for which attribute information is to be retrieved. Then, in response to the user input, an instruction confirms a correspondence between the first image information 1 and the second image information 2 with respect to the object 3, and the correspondence is stored in response to the input. The attribute information is retrieved on the basis of the stored correspondence between first and second image information and the stored linkage between the first image information and the attribute information, and the retrieved attribute information that is a result 8 of this retrieval is displayed. In this manner, e.g., a portion of the resident database (attribute information file 4) is retrieved by reference to a road map (second image information 2) for which there is no linkage with the resident database, by using the linked second image information 2 and the positional relationship between images as a key.

In FIG. 2, a storage unit 9, an input device 10, an output device 11, a display buffer memory 12, a main memory 13 for storing a program which will be described later, and a central processing unit (CPU) 14 are connected to one another by a system bus 15. The main memory 13 stores a retrieval program 16 to retrieve a database, display control program 17, a program 18 to determine correspondence between images, a program 19 to receive input of an object for basis of retrieval, and a program 20 to store a correspondence between images. If the main memory 13 has a sufficient capacity, all the files 4, 5, 6, 7 may be stored on the main memory 13 without using the storage unit 9. The programs 16, 17, 18, 19, 20 on the main memory 13 may be stored in the storage unit 9 so that they can be read into the main memory 13 at system startup.

Figures 3, 4, 5:
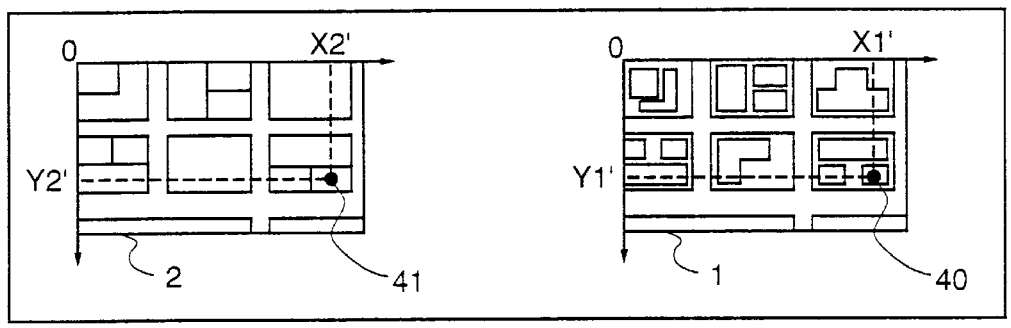
FIG. 3 shows a link information file table in storage of FIG. 1 and linking first and second linkage information.
FIG. 4 shows one example of correspondence between the first and second images.
FIG. 5 shows a link information file table in storage of FIG. 1 and linking an image and attributes.

A link information table 30 of FIG. 3 provides linkage information between images and is in the file 6. The preparation of data which links image information and attribute information can be accomplished by generating information indicative of correspondence information between attribute information and image information which are displayed on a screen, and by choosing a character string representative of a key of a corresponding target by use of a cursor displayed in the character string, as described in Japanese Patent Laid-open No. 6-149532/1994, corresponding to U.S. application Ser. No. 08/144,838.

The table 30 is made up of a column 31 which contains object numbers of the first image information 1, a column 32 which contains coordinates of the objects in the first image information 1, a column 33 which contains object numbers of the second image information 2, and a column 34 which contains coordinates of the objects in the second image information 2. The image numbers peculiar to the first image information 1 are stored in the "IMAGE NO." column 31, while a plurality of coordinates indicative of the position of an area occupied by one object in the image information 1 are stored in the "X, Y" column 32. Similarly, predetermined values are stored in the "IMAGE NO." column 33 and in the "X, Y" column 34 for the second image information 2. For example, if a point 40 indicative of a particular object contained in the first image information 1 and a point 41 indicate of a particular object contained in the second image information 2 correspond with each other as shown in FIG. 4, "1" and "2" are respectively stored in the "IMAGE NO." column 31 and the "IMAGE NO." column 33, as shown in a row 35 of FIG. 3. In addition, a set of coordinates of an area which contains (X1', Y1') is stored in the "X, Y" column 32, while a set of coordinates of an area which contains (X2', Y2') is stored in the "X, Y" column 34.

A link information table 50 between images and attributes is stored in the file 5 for each set of image information and attribute information. The construction of such a table 50 will be described with reference to FIG. 5. The table 50 includes a column 51 for identification (database number and record number) of each information indicated by the attribute information, a column 52 for identification of image number information corresponding with the attribute information, and an X, Y column 53 for a plurality of coordinates indicative of the position of an area occupied by an object in the image information.

If the part of each of the tables stored in the files 5 and 6 that corresponds to a map containing a retrieval target is loaded in a main memory 13, the speed of processing can be increased.

Figure 6:
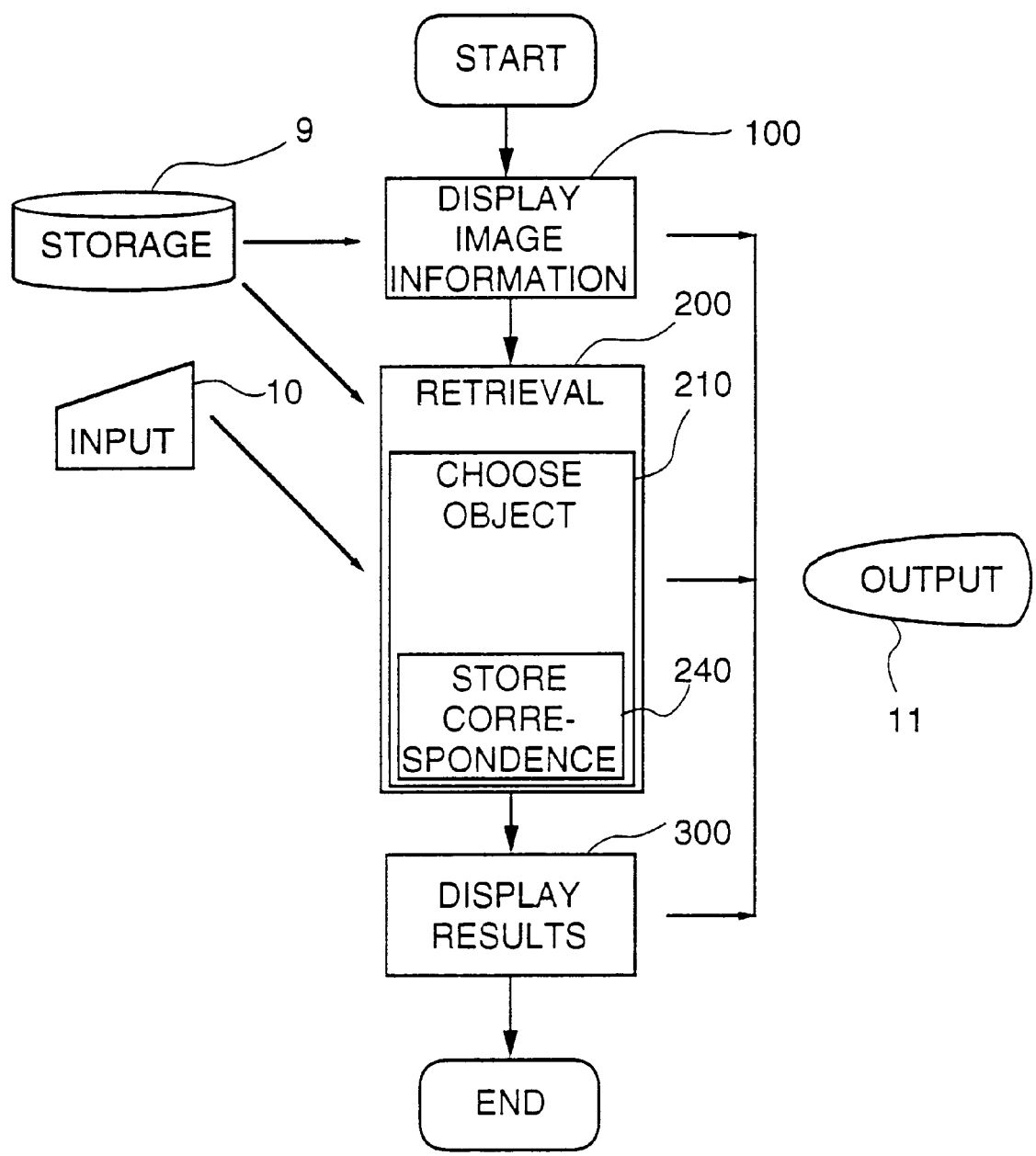
FIG. 6 is a flowchart showing the entire process of operating the system of FIG. 1.
Figure 10:
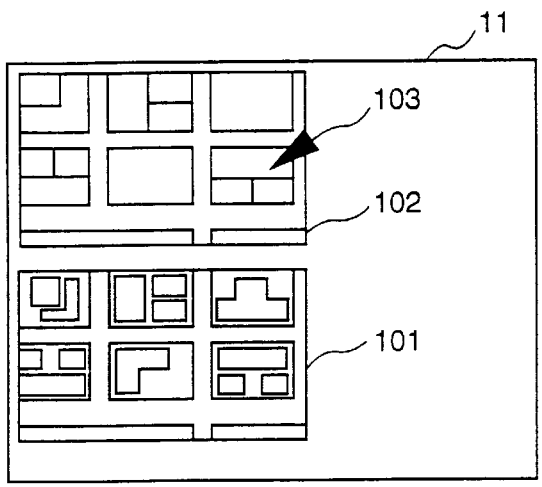
FIGS. 10(a) to 10(e) show screen display examples used in operating the system of FIG. 1.
Figure 10:
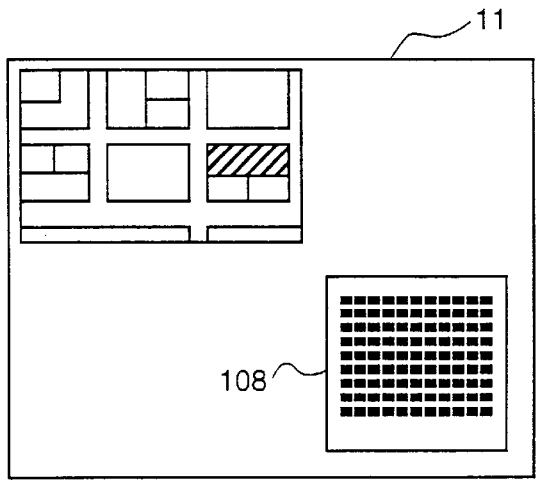
Figure 10:
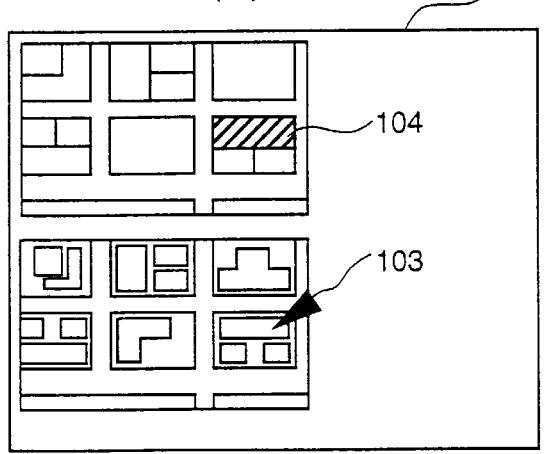
Figure 10:
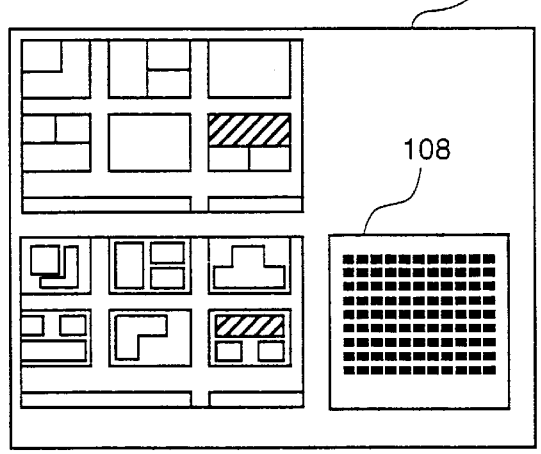
Figure 10:
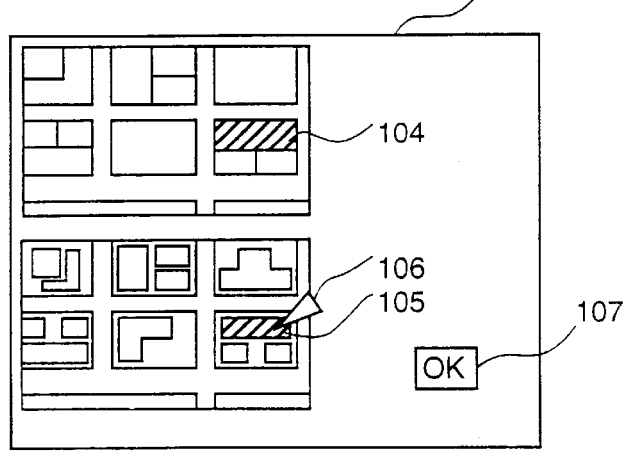

Referring to FIG. 6, when started the system is image information 7 is read from the storage unit 9 and displayed on the output device 11 in accordance with the program 17 (Step 100). One example of the screen displayed on output device 11 at this time is shown in FIG. 10(*a*). The screen is made up of a display area 101 for display of the first image information 1 and a display area 102 for display of the second image information 2.

Then, if an instruction to retrieve attribute information corresponding to the displayed image information is input through the input device 10, associated information is read from the storage unit 9 in accordance with the program 16, so that a retrieval is executed while displaying the status of the retrieval on the output device 11 (Step 200). The details of the retrieval process 200 will be described with reference to the flowcharts of FIGS. 7, 8 and 9 as well as the screen display examples shown in FIG. 10.

Figure 7:
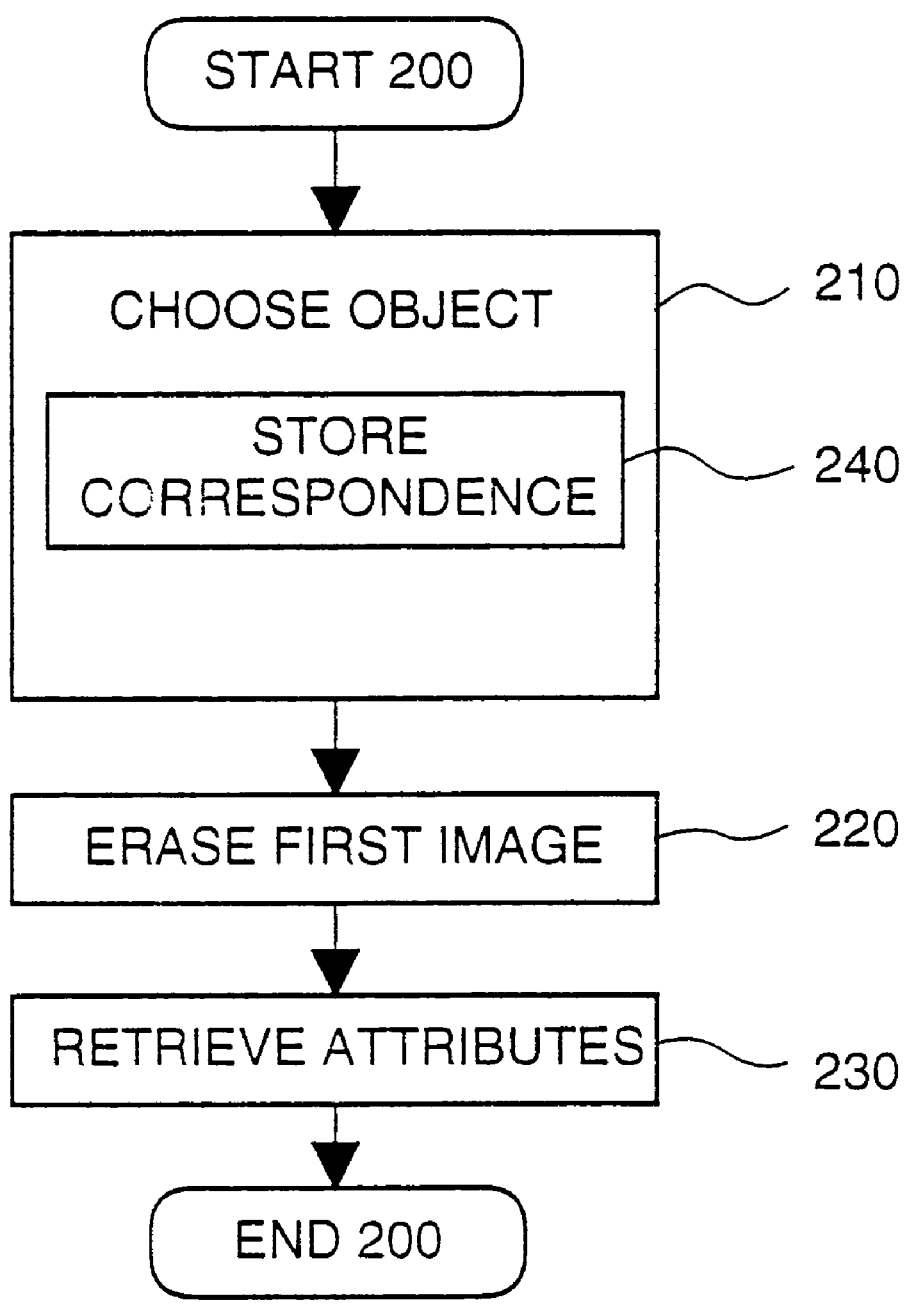
FIG. 7 is a flowchart of the retrieval step of the process of FIG. 6.

In the retrieval process (Step 200), as shown in FIG. 7, an object to retrieve the attribute information 4 is chosen to correspond between the image information (Step 210). The resultant correspondence information is stored in the file 6 (Step 240), the first image information 1 is erased from the display screen (Step 220), and a retrieval of attribute information about the chosen object is executed (Step 230). By erasing the image information 1 from the display screen, the user is informed that the resultant correspondence information has been stored, to inform the user of the status of progress of the retrieval. Also, if Step 220 is executed after Step 230, the user is informed of the completion of retrieval of attribute information by erasing the first image information 1 from the display screen.

Figure 8:
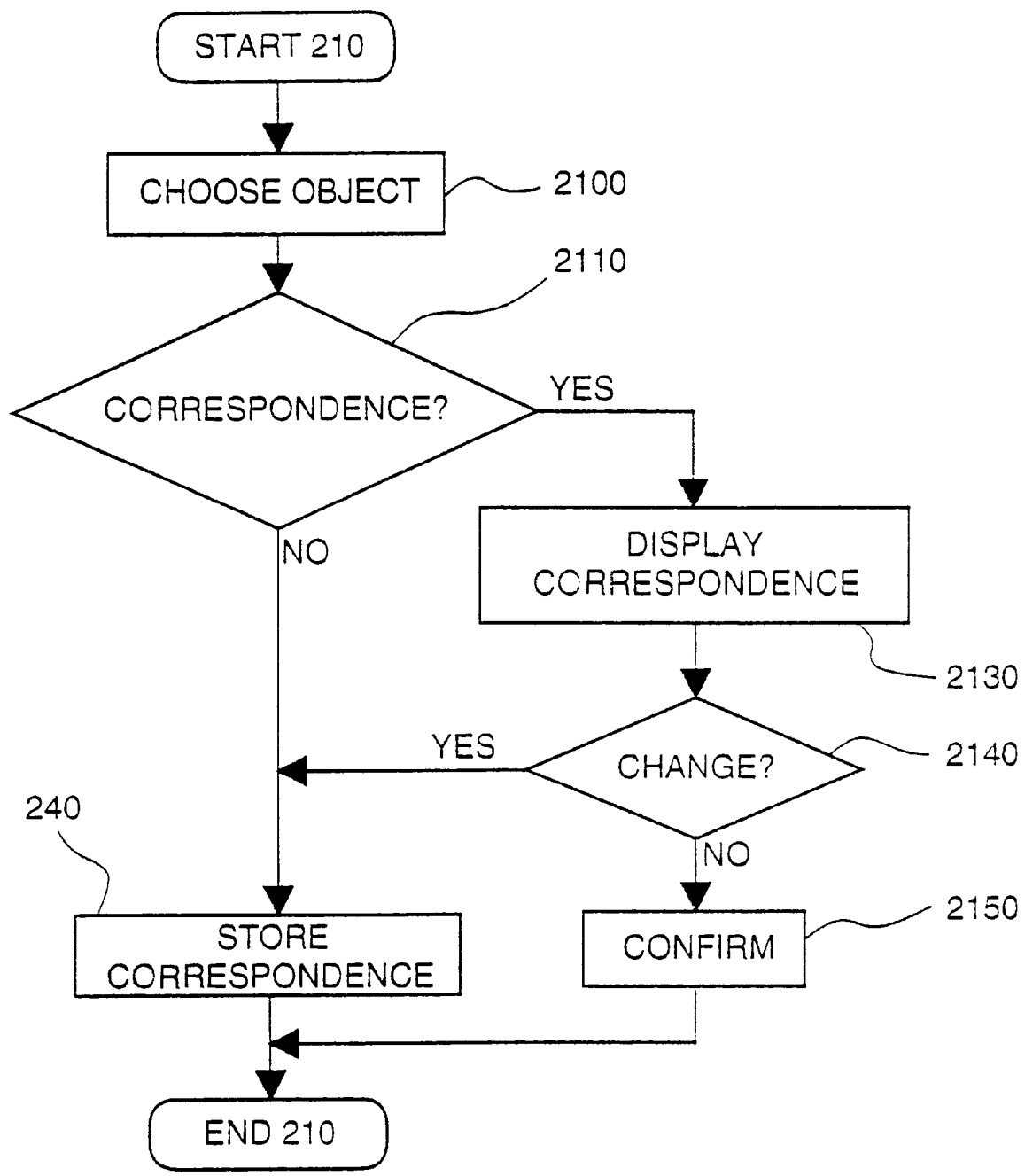
FIG. 8 is a flowchart of the object choosing step of FIG. 6.

The choice of object that thereby causes the image information to correspond thereto (Step 210) will be described below with reference to FIG. 8. An object in the displayed second image information 2 is chosen by the input device 10 in accordance with the program 19 (Step 2100). For example, as shown in FIG. 10(*a*), a cursor 103 is moved onto an object to be chosen, and an instruction to choose the object is input. The cursor 103 for choosing the object may be manipulated by a mouse or a pen input device, or may also be chosen by moving a finger or hand on a touch panel attached to the display screen.

Then, it is determined whether a correspondence relative to the object input in Step 2100 is already present in the file 6 (Step 2110). If no correspondence is present, a correspondence is stored (Step 240). If there is a correspondence, this correspondence is displayed in accordance with the program 17 (Step 2130). FIG. 10(*c*) shows one example of a screen on which the correspondence is displayed. One method of displaying the correspondence is to display a part 105 in the first image information 1 that corresponds to a chosen object 104 in the second image information 2, in a manner different from the manner in which the other parts are displayed. Such different displays can be realized by varying the luminance, color, shape, pattern or line thickness of the part 105 or by blinking the display of the part 105.

Otherwise, a cursor may be displayed on the part 105 in the first image information 1 that is corresponding with the part 104 in the second image information 2. In this case, the cursor is displayed in a manner different from the manner in which the cursor 103 is displayed. By displaying the cursor in such a different manner, it is possible to inform the user that a correspondence between objects is already present and the process waits for confirmation. In addition, the user can know a process which can next be executed, while inputting a correspondence or searching for a retrieval target, whereby the efficiency of the retrieval process can be improved.

The user determines whether it is necessary to change the correspondence, while viewing the display of the correspondence such as that shown in FIG. 10(c). If it is necessary to change the correspondence, the user inputs an instruction to change the correspondence. It is determined (Step 2140) whether the correspondence has been changed according to the input instruction. If there is a change in the correspondence, the process proceeds to Step 240, in which the process of storing the correspondence is executed. If there is no change in the correspondence, the process proceeds to Step 2150.

In Step 2150, an input for confirming the correspondence is requested in accordance with the program 18. One method of providing an input for confirming the correspondence is to choose a confirmation area 107 (called "OK button") as shown in FIG. 10(c). In FIG. 10(c), as a method of providing an input for confirming the correspondence, there is shown an area for receiving the input for confirming the correspondence, in an area different from the corresponding part 105 in the first image information 1. By so disposing the area for receiving the input for confirming the correspondence, an input of the position of the corresponding part is distinguished from an input for confirming the correspondence.

In another method of providing the input for confirming the correspondence, the cursor 106 is moved to the corresponding part 105 and the correspondence is confirmed in a different way from that of inputting the position of the corresponding part 105. For example, the correspondence is confirmed by pressing another mouse button different from the one for inputting the position, or by pressing one button within a predetermined time after the same button is depressed for a position input.

As described above, by inputting the correspondence between positions different from the input for confirming the correspondence, it is possible to provide the two inputs in the same area. Accordingly, since there is no need to move the cursor for providing an input for confirming the correspondence, it is possible to prevent the user from losing sight of an object by looking away from the map. Accordingly, efficient confirmation of the correspondence is possible.

Figure 9:
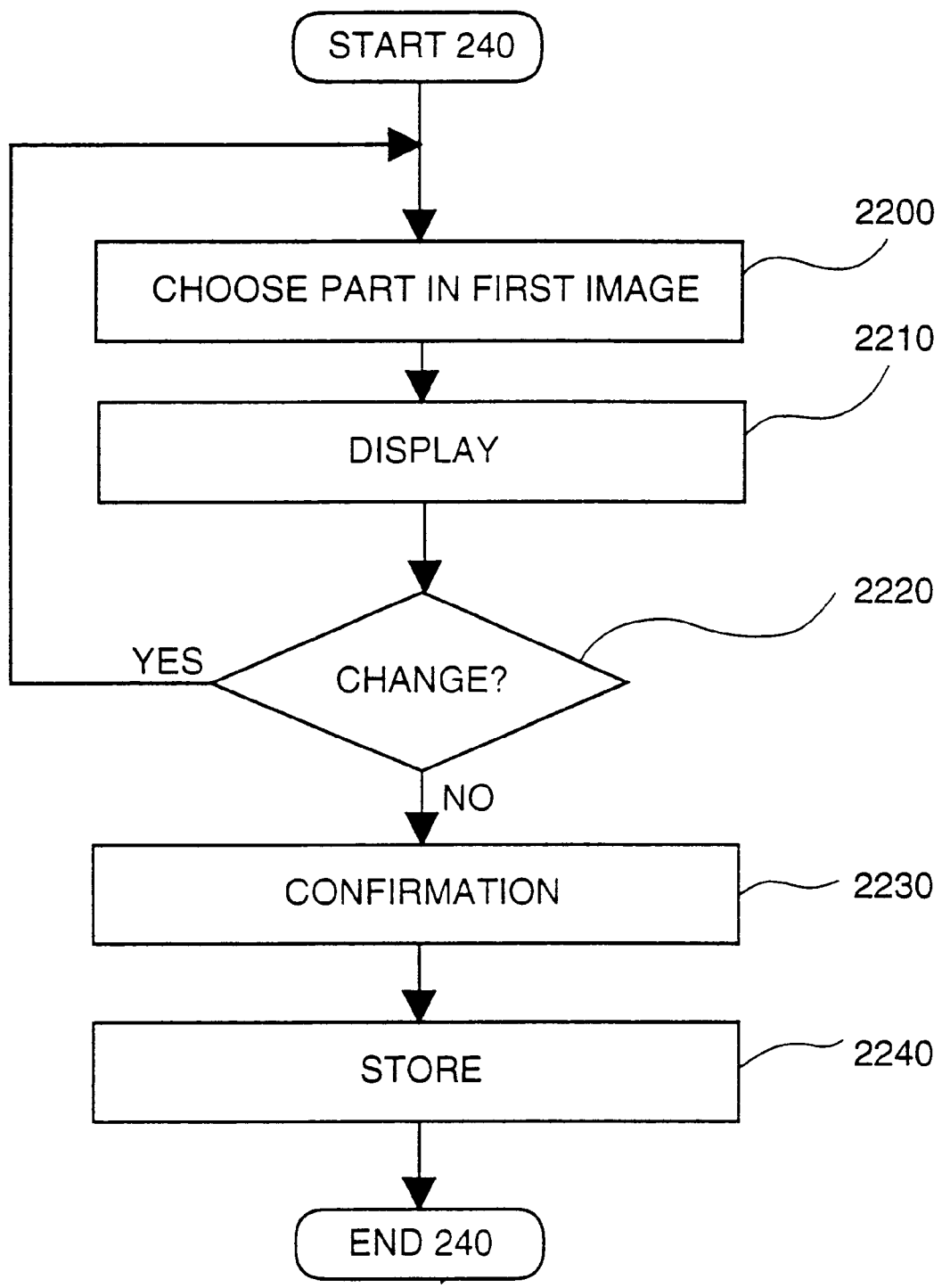
FIG. 9 is a flowchart of the storing correspondence step of FIG. 6.

The process of storing the resultant correspondence information (Step 240) will be described below with reference to FIG. 9. First, in FIG. 10(c), the part in the first image information 1 corresponding to the object in the second image information 2 which has been chosen in Step 2100 is chosen in accordance with the program 18 (Step 2200). The area 104 shown in FIG. 10(b) is the object chosen in Step 2100, and the part indicated by the cursor 103 is that chosen in Step 2200.

The chosen correspondence is displayed in accordance with the program 17 (Step 2210), and it is determined whether there is a change in the correspondence (Step 2220). If there is a change in the correspondence, the process returns to Step 2220. If there is no change in the correspondence, the process waits for an input for confirming the correspondence (Step 2230). Steps 2210 through 2230 are similar to Steps 2130 through 2150 shown in FIG. 8. In response to the input for confirming the correspondence in FIG. 9 Step 2230, the correspondence is stored in the file 6 in accordance with the program 20 (Step 2240).

In response to the storing of the correspondence, the first image information 1 is erased from the display screen (Step 220) and the part in the attribute information 4 which corresponds to the part chosen in the first image information 1 is retrieved by referring to the link information file 5 linking images and attributes (Step 230), and the retrieval process is brought to an end (Step 200). Only a retrieval of the attribute information 4 may be executed without erasing the display screen for display of the first image information 1, in response to the storing of the correspondence.

Finally, the output of the result 8 of the retrieval executed in the retrieval process (Step 200) shown in FIG. 6 will be described below. As shown in FIG. 6, the result 8 of the retrieval executed in Step 220 in accordance with the program 17, i.e., the attribute information 4 corresponding to the part chosen in the second image information 2, is outputted to the output device 11 (Step 300). Although the attribute information is retrieved once on the basis of the second image information 2 in the above-described process, the processing of Steps 100 through 300 may be repeated in response to the choosing of an object for which attribute information is to be retrieved. The screen display example obtained in Step 300 is shown in FIG. 10(d). In FIG. 10(d), an area 108 is an area to display the result of a retrieval. A screen display example obtained if there is no erasure of the first image information 1 (Step 200 of FIG. 7) is shown in FIG. 10(e).

In the present embodiment, the process of drawing a correspondence between images and the process of retrieving attribute information are executed as a series of processes. However, the correspondence between images may be stored in the file 6 in advance in the process 210 shown in FIG. 8, and the result 8 of a retrieval may be displayed by retrieving associated attribute information from the file 4 while returning to the file 5 and the file 6 in accordance with an input to choose the object 3 in the second image information 2 displayed on the output device 11.

Figure 11:
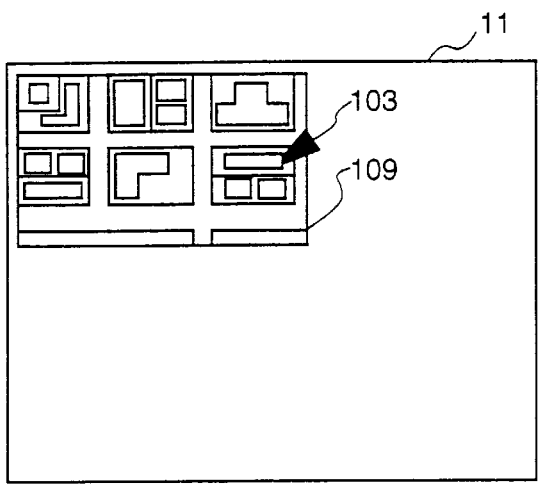
FIGS. 11(a) to 11(e) show screen display examples used in operating the system of FIG. 1.
Figure 11:
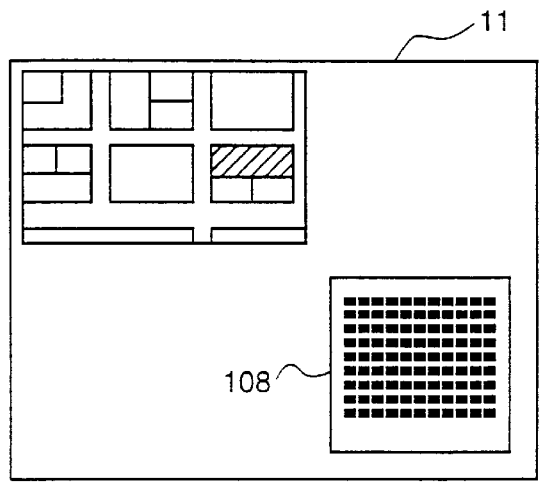
Figure 11:
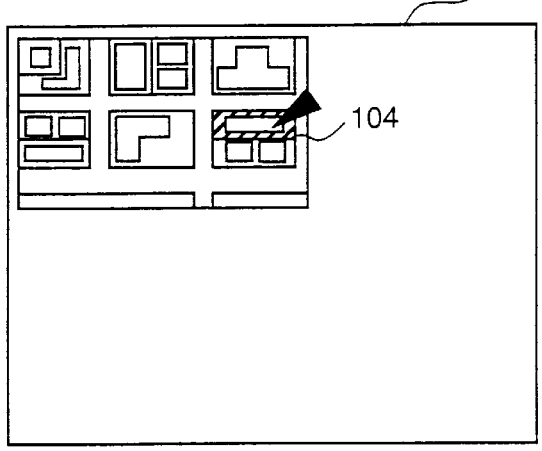
Figure 11:
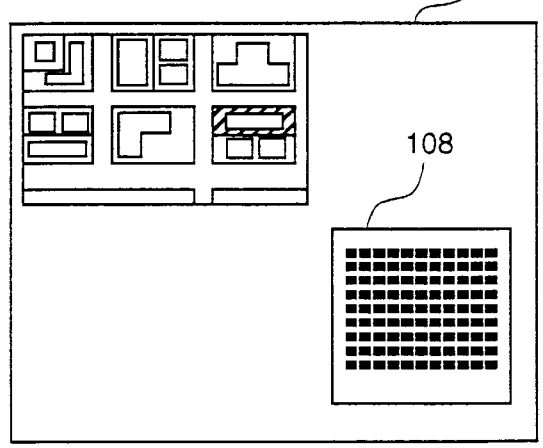
Figure 11:
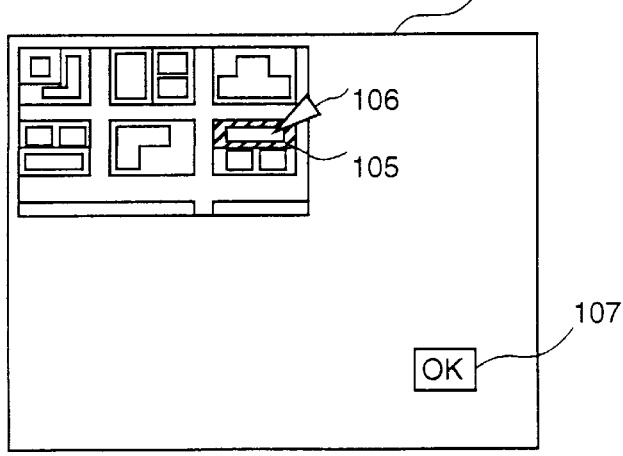

Other modes of operation of the present embodiment will be described below. In the case of the first display mode of images in Step 100 shown in FIG. 6, the first image information 1 and the second image information 2 are separately displayed in area 101 and area 102, respectively, as shown in FIG. 10(a). In a second display mode, the first image information 1 overlies the second image information 2 in an area 109 as shown in FIG. 11(a). Since the first image information 1 and the second image information 2 approximately correspond to each other in positional relation, the corresponding parts between the first image information 1 and the second image information 2 are respectively displayed at approximately identical locations by overlying one with the other as shown in FIG. 11, so that it becomes easy for the user to find the correspondence. Accordingly, since it is possible to simultaneously choose a part in the first image information 1 and a part in the second image information 2 so that these parts can be linked to each other, an efficient retrieval is realized. FIGS. 11(a) through 11(e) correspond to FIGS. 10(a) through 10(e), respectively.

Figure 12:
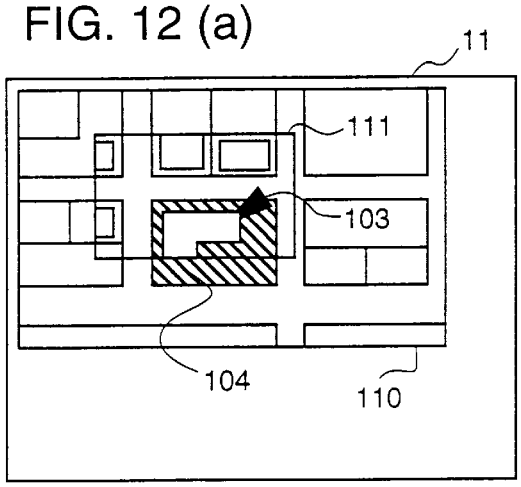
FIGS. 12(a) to 12(f) show screen display examples used in operating the system of FIG. 1.
Figure 12:
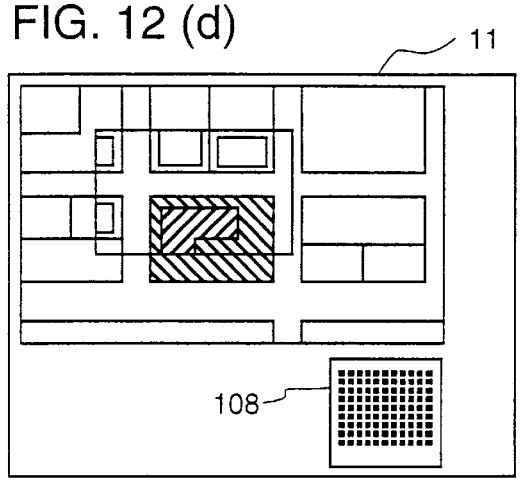
Figure 12:
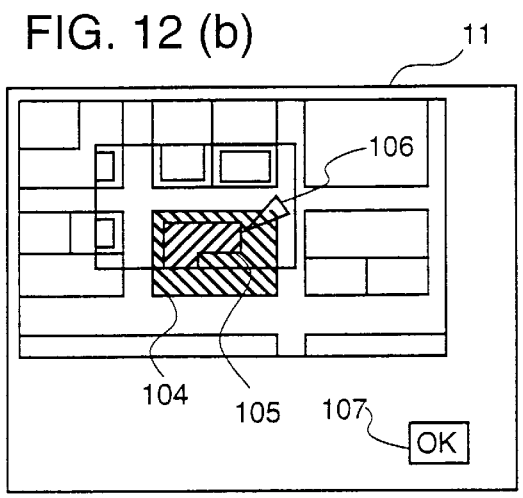
Figure 12:
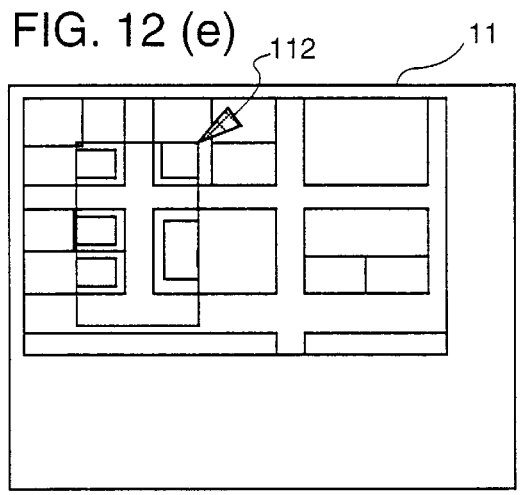
Figure 12:
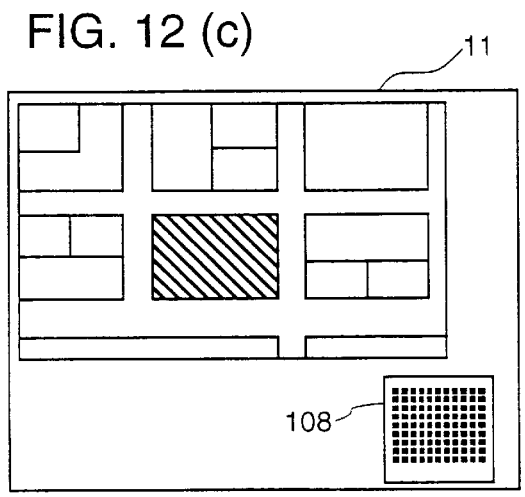
Figure 12:
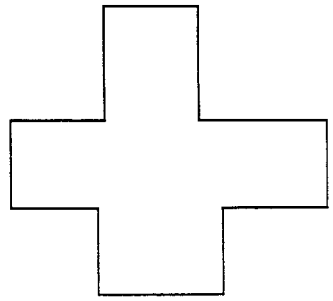

A third display mode will be described below with reference to FIGS. 12a to 12f. In the second display mode, the first image information 1 overlies the second image information 2 in the entire image display area 110. In the second modification, an overlying area 111 is set to an area smaller than the overlain area 110 in which the entire image information is displayed, and the first image information 1 partly overlies the second image information 2. The overlying area can be moved by using the cursor 112 shown in FIG. 12(e), and the shape and size of such an overlying area can also be changed by using the cursor 112. By restricting the overlying area, only an area of interest is displayed so that it becomes easy for the user to select a necessary object from two pieces of image information which are complicatedly superimposed. Also, if the shape of the area 111 is made circular, a zone which expands equidistantly from the center can be displayed. If a shape, such as that shown in FIG. 12(f), is adopted, it is possible to view a zone which surrounds crossroads. Accordingly, since it is possible to extract a part desired to be viewed by changing the shape or size of the overlying area, the third display mode is useful in making a retrieval in multiple steps according to individual purposes. If the third display mode is user-chosen in the retrieval process shown in FIG. 6, FIGS. 12(a) through 12(d) correspond to FIGS. 10(b) through 10(e).

Figure 13:
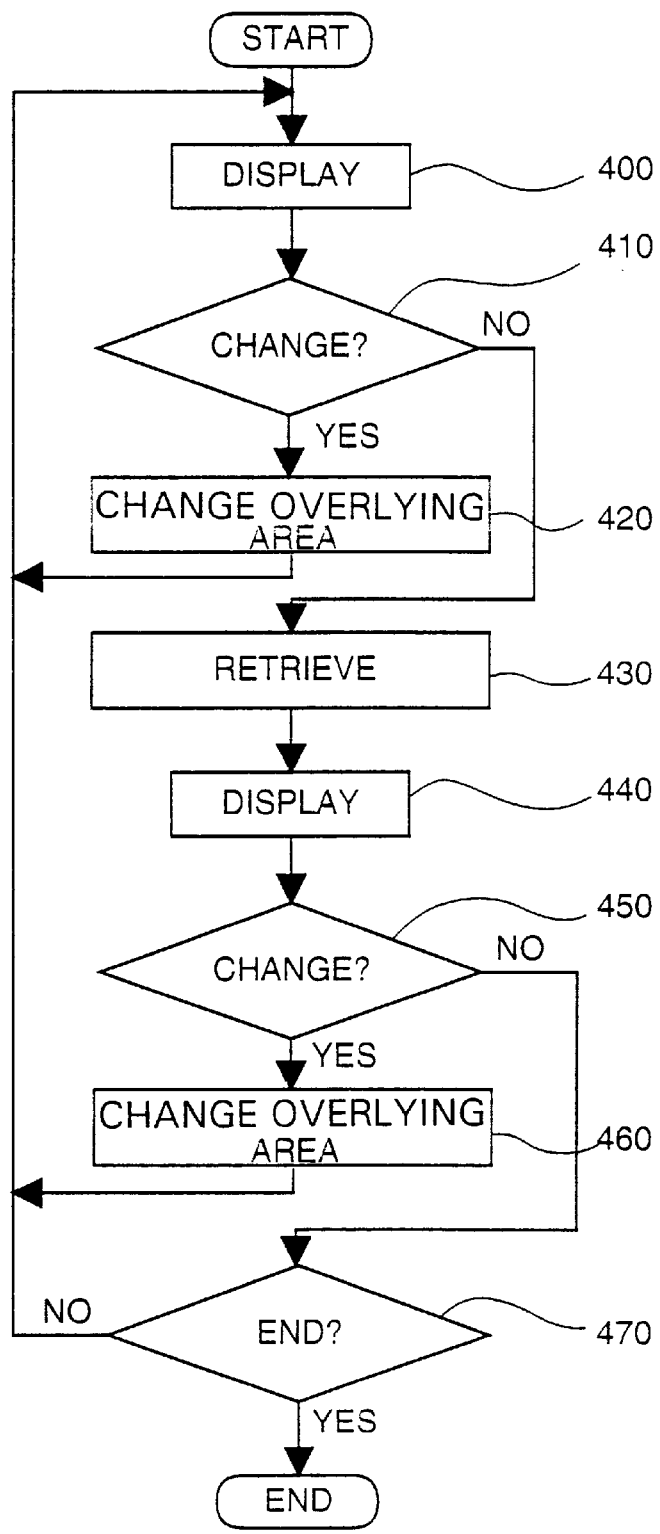
FIG. 13 is a flowchart showing a mode of operation for the system of FIG. 1.

A fourth display mode will be described with reference to the flowchart shown in FIG. 13 which corresponds to FIG. 6. Although the description of the third display mode has referred to the feature of changing the overlying area, the fourth display mode is characterized by changing an overlying area while retrieving image information. First, image information is displayed (Step 400), and it is determined whether there is an input for changing an overlying area (Step 410). If there is such an input, the overlying area is changed (Step 420) and the process returns to Step 400. If there is no such input, a retrieval process is executed (Step 430), and the result of the retrieval is displayed (Step 440). If a user reviews the result of the retrieval, decides to change the overlying area and provides an input for changing the overlying area (Step 450), the overlying area is changed (Step 460). If there is no such input in Step 450, the process proceeds to Step 470. If there is an end input in Step 470, the present system is brought to an end. If there is no end input, the process returns to Step 400. Since the user can change an overlying area between a process of displaying images and a retrieval process, the user can execute the next retrieval process while referring to the result of a retrieval of two pieces of image information which are superimposed. Accordingly, it is possible to easily execute various retrieval processes under varied retrieval conditions according to the results of individual retrievals.

Figure 14:
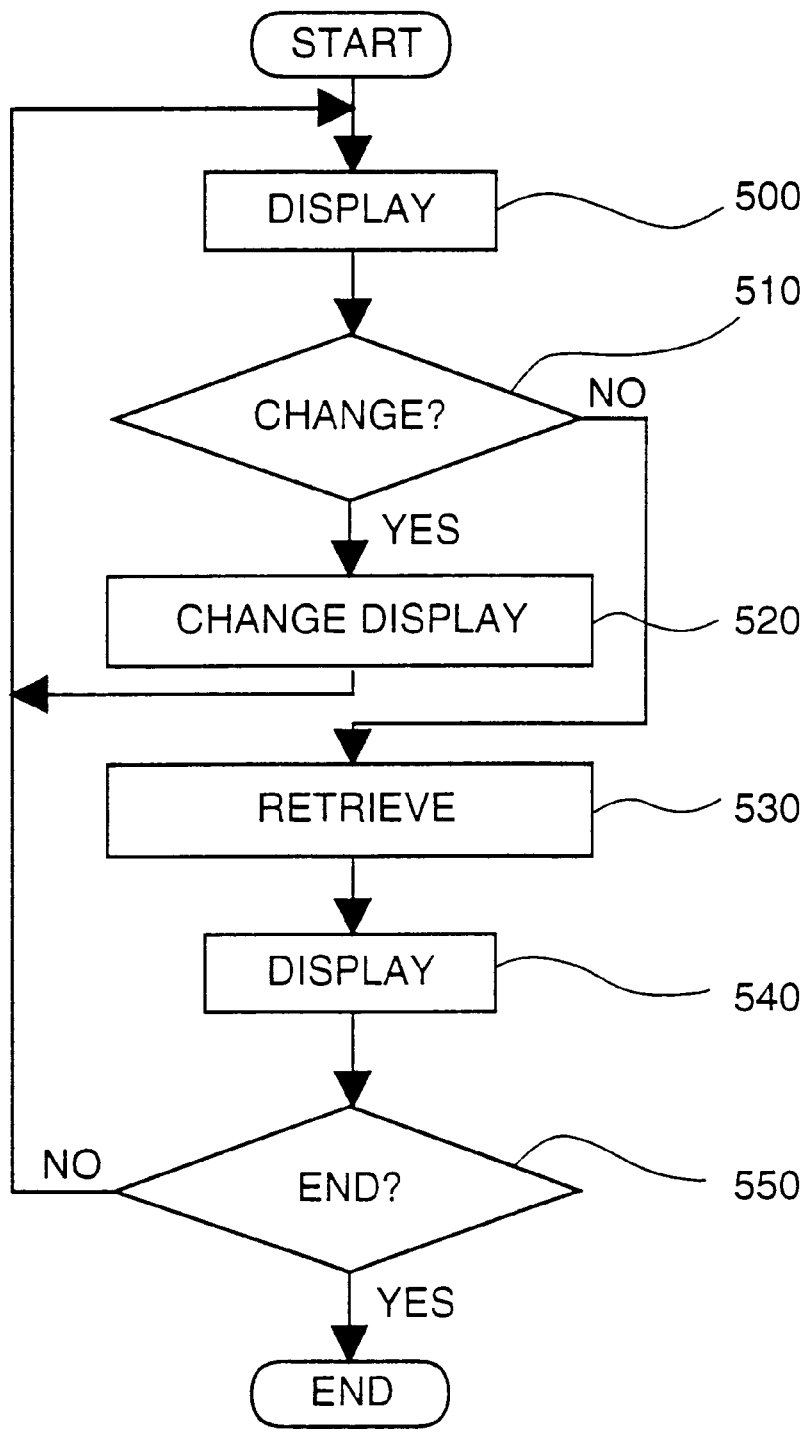
FIG. 14 is a flowchart showing a mode of operation for the system of FIG. 1.
Figure 15:
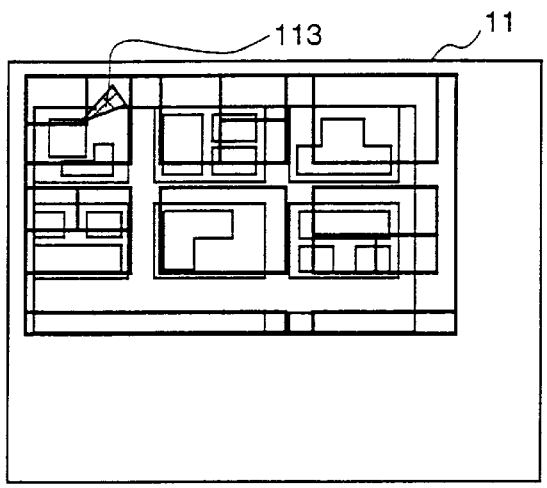
FIG. 15 shows screen display examples used in operating the system of FIG. 1.
Figure 15:
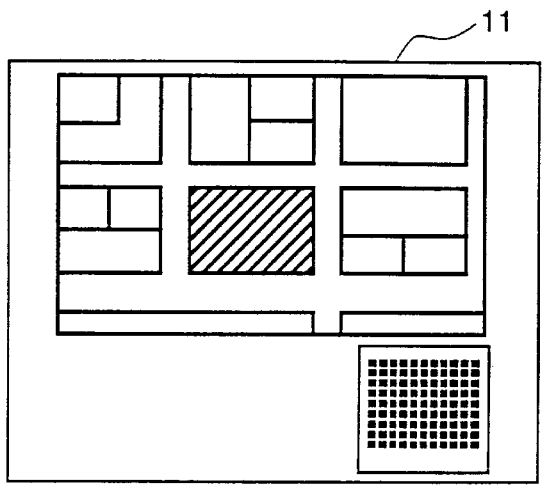
Figure 15:
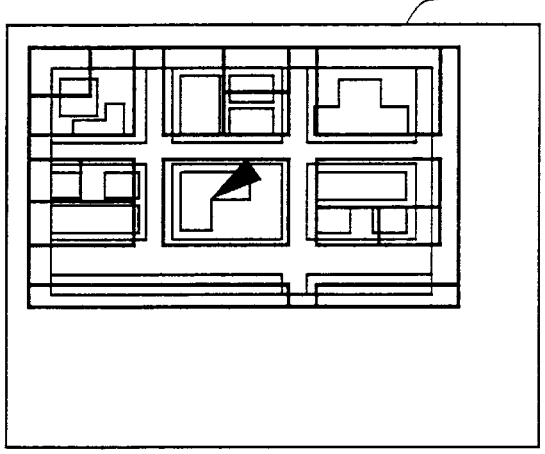
Figure 15:
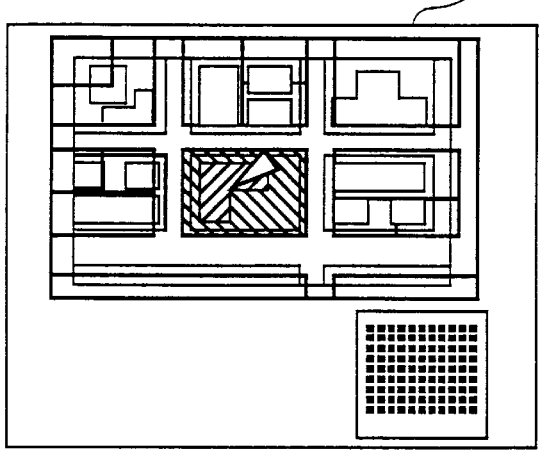
Figure 15:
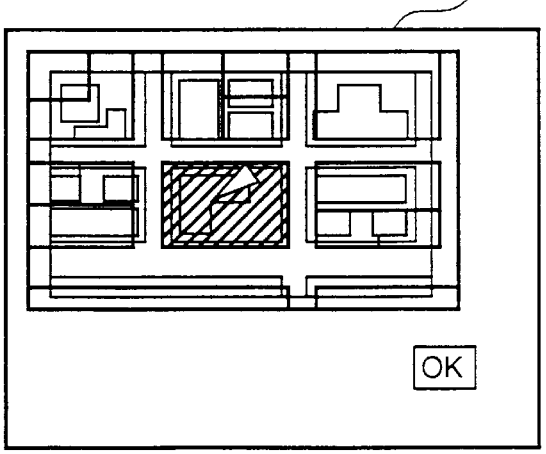

A fifth mode of operation will be described below with reference to the flowchart of FIG. 14 which corresponds to FIG. 6 and the display examples shown in FIG. 15. None of the second to fourth modes takes account of changing the relative positional relation between two pieces of image information which are to be superimposed. The fifth mode is intended to change the relative positional relation between two pieces of image information in causing them to be superimposed.

First, the first image information 1 which contains character information is displayed over the second image information 2 made up of several areas each surrounded by a thick-line frame, as shown in FIG. 15(a) (Step 500). If the user determines that the state in which the first image information 1 overlies the second image information 2 is different from a desired state and it is necessary to change the manner in which the first image information 1 overlies the second image information 2, the user provides an input for changing the relative positional relation between the first image information 1 and the second image information 2. The system determines whether such input has been provided (Step 510). If there is an input, the system executes a display position changing process (Step 520). As one display position changing method, there is a method of choosing one point in the first image information 1 by using a cursor 113, moving this point up to a necessary point on the display screen (dragging), and changing a display position. If there is no input for changing the display position, a retrieval process for retrieving the attribute information 4 which corresponds to the first image information 1 overlying the second image information 2 is executed (Step 530). Then, the result 8 of this retrieval is displayed (Step 540). If there is no end input, the process returns to Step 500. If there is an end input, the process is brought to an end. The steps of displaying image information, retrieving and displaying the result of the retrieval are similar to the corresponding steps shown in FIG. 6, and the description thereof is omitted. Incidentally, FIG. 15(b) and FIGS. 15(c) through 15(e) correspond to FIG. 11(a) and FIGS. 11(c) through 11(e), respectively.

The method of changing the display position of image information in the above-described manner is useful in displaying two pieces of image information in an approximately superimposed state or two pieces of image information in a state different from the state desired by a user and retrieving associated attribute information while confirming the correspondence therebetween.

Figure 16:
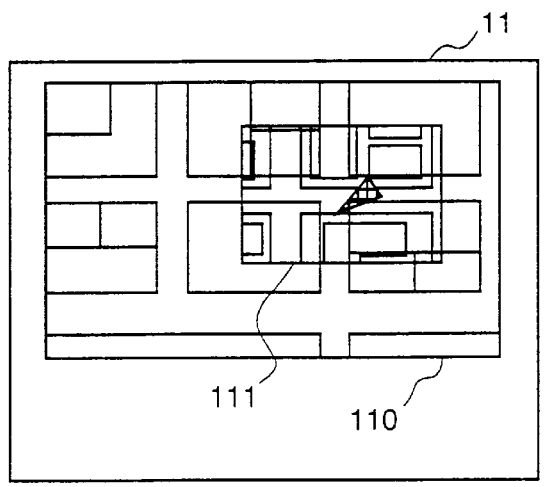
FIG. 16 shows screen display examples used in operating the system of FIG. 1.
Figure 16:
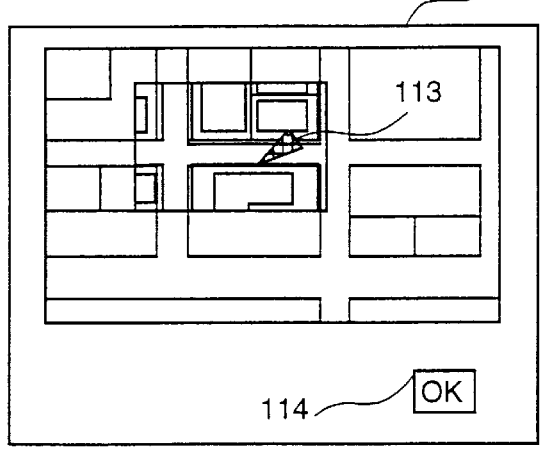
Figure 16:
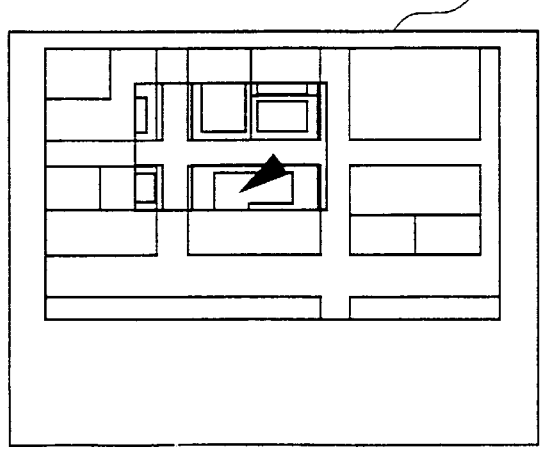
Figure 16:
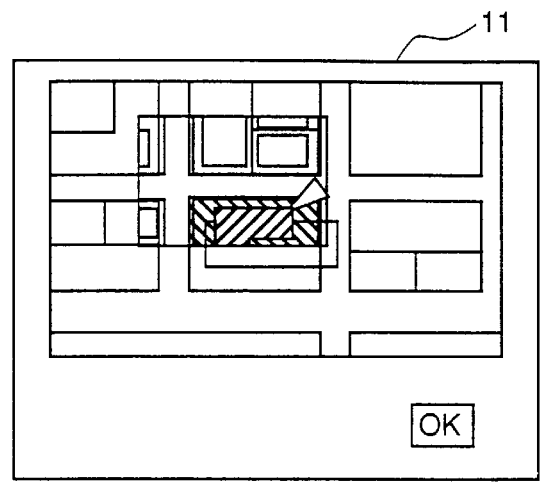
Figure 16:
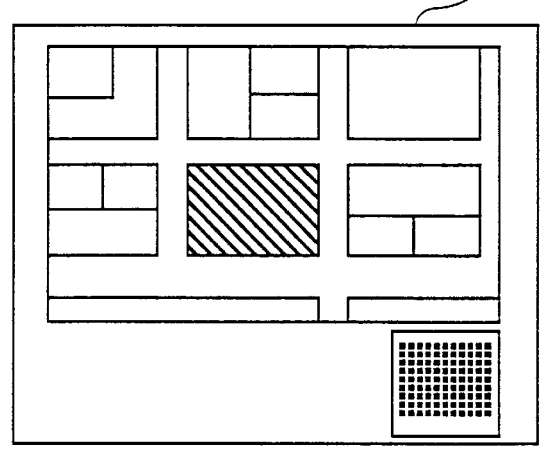
Figure 16:
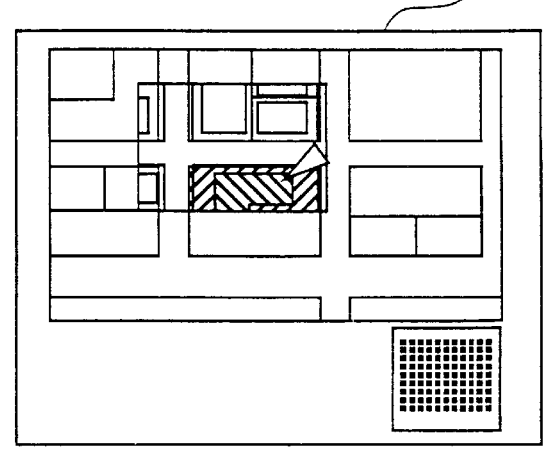

With reference to FIG. 16, the sixth mode of operation differs from the fifth mode in that two pieces of images are partly superimposed in a restricted area similarly to the third mode. For an example of the inputting: the first image information 1 displayed as shown in FIG. 16(a) is moved to a position, such as that shown in FIG. 16(b), by using the cursor 113, and if the position is satisfactory, an OK button 114 is selected to confirm. The subsequent processing of FIGS. 16(c) through 16(f) correspond to that of FIGS. 11(b) through 11(e). Thus, even if two objects of images do not strictly positionally correspond to each other are employed, a deviation of the correspondence is reduced by moving one to easily confirm the correspondence. The correspondence between objects of two images is input by relatively moving the images to superimpose one object over the other, even if the entire images do not positionally correspond to each other.

When the displayed first and second images overlap, there is more room to display a wide area and partly magnify and display a particular area, as compared with displaying images separately, facilitating the inputting for detailed maps. Image overlapping facilitates the correspondence between the first and second images, for efficient retrieval.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

We claim:

1. A data retrieval method, performed by a data storing, inputting, outputting and handling system, including the steps of:

storing attribute information;

displaying on a display screen first image information corresponding to and linked to the attribute information;

displaying, on the display screen, second image information to overlie said first image information;

inputting from a user and storing a positional linkage correspondence between said first image information and said second image information, and storing the positional linkage correspondence in response to a user input;

indicating a part of the second image information; and in response to said indicating step, retrieving from data storage and outputting the attribute information corresponding to and linked to a part of said first image information having positional linkage correspondence to said indicated part of said second image information.

2. A retrieval method employing image information according to claim 1, further including the step of erasing said first image information from said display screen in response to said inputting step.

3. A data retrieval method for retrieving attribute information by designating an object in a displayed image, including the steps of:

displaying on a display screen first image information having a prestored correspondence to stored attribute information;

displaying, on said display screen, second image information to overlie said first image information; and retrieving and displaying at least some of said attribute information by designating at least one object of said second image information.

4. A data retrieval method according to claim 3, wherein the second image information has no prestored correspondence to the stored attribute information.

5. A program stored on a computer-readable storage medium and executed for retrieving attribute information by designating an object in a displayed image, including the steps of:

displaying on a display screen first image information having a prestored correspondence to stored attribute information;

displaying, on said display screen, second image information to overlie said first image information; and retrieving and displaying at least some of said attribute information by designating at least one object of said second image information.

6. A program according to claim 5, wherein the second image information has no prestored correspondence to the stored attribute information.

7. A retrieval program stored on a computer-readable storage medium and executed for retrieving attribute information by designating an object in a displayed image, including the steps of:

displaying on a display screen first image information corresponding to stored attribute information;

displaying, on said display screen, second image information to overlie said first image information; and retrieving and displaying at least some of said attribute information by designating at least one object of said second image information.

8. A retrieval program according to claim 7, wherein the second image information has no prestored correspondence to the stored attribute information.

9. A data retrieval method for retrieving attribute information by designating an object in a displayed image, including the steps of:

displaying on a display screen first image information corresponding to stored attribute information;

displaying, on said display screen, second image information to overlie a part of said first image information; and retrieving and displaying at least some of said attribute information by designating at least one object of said second image information.

10. A data retrieval method according to claim 9, wherein the second image information has no prestored correspondence to the stored attribute information.

11. Linkage correspondence information linking together a plurality of image information, said linkage correspondence information being grouped into records, each record comprising:

a first pair of a first image identification and coordinate values of an object included in first image information; and a second pair of a second image identification and coordinate values of another object included in second image information, said second pair being stored with a correspondence to said first pair.

12. Linkage correspondence information linking together image information and attribute information, said linkage correspondence information being grouped into records, each record comprising:

an identification of each of said attribute information of an object included in said image information; and a pair of image identification and coordinate values of said object, said pair being stored with a correspondence to said identification.

* * * * *